United States Patent
Morant et al.

(10) Patent No.: US 10,620,522 B2
(45) Date of Patent: Apr. 14, 2020

(54) DMD PROJECTOR WITH TIR PRISM

(71) Applicant: BAE SYSTEMS plc, London (GB)

(72) Inventors: Paul Stewart Morant, Rochester Kent (GB); Graham Laurence Hogg, Rochester Kent (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/507,349

(22) PCT Filed: Sep. 1, 2015

(86) PCT No.: PCT/GB2015/052517
§ 371 (c)(1),
(2) Date: Feb. 28, 2017

(87) PCT Pub. No.: WO2016/034867
PCT Pub. Date: Mar. 10, 2016

(65) Prior Publication Data
US 2017/0285453 A1    Oct. 5, 2017

(30) Foreign Application Priority Data

Sep. 4, 2014    (GB) .................................. 1415632.7

(51) Int. Cl.
*G03B 21/28* (2006.01)
*G02B 5/04* (2006.01)
(Continued)

(52) U.S. Cl.
CPC .............. *G03B 21/28* (2013.01); *G02B 5/04* (2013.01); *G02B 27/0101* (2013.01);
(Continued)

(58) Field of Classification Search
CPC ........ G03B 21/00; G03B 21/20; G03B 21/28; G03B 21/2066; G03B 21/008;
(Continued)

(56) References Cited

U.S. PATENT DOCUMENTS 3,879,182 A  *  4/1975  Strack ................... C03B 23/047
                                                                 359/831
2003/0179347 A1    9/2003  Tomiya
(Continued)

FOREIGN PATENT DOCUMENTS

CN    101576701 A    11/2009
JP    2000330072 A   11/2000
(Continued)

OTHER PUBLICATIONS

International Preliminary Report on Patentability received for Patent Application No. PCT/GB2015/052517, dated Mar. 16, 2017. 8 pages.
(Continued)

*Primary Examiner* — Isiaka O Akanbi
*Assistant Examiner* — Danell L Owens
(74) *Attorney, Agent, or Firm* — Finch & Maloney PLLC

(57) ABSTRACT

A projection apparatus comprising a prism assembly 7 including an input sub-prism 1 possessing a first interface surface and an output sub-prism 2 adjacent to the input sub-prism possessing a second interface surface. The second interface surface is spaced from the first interface surface immediately proximate to it and extends over it to receive display light 12 transmitted through the first interface surface. A panel 8 comprising a plurality of selectively adjustable reflecting elements is arranged to receive from the input sub-prism an illumination light totally internally reflected from the first interface surface and selectively to reflect received illumination light back through the input sub-prism for transmission through the first interface surface for receipt as display light 13 by the output prism at said second interface surface.

19 Claims, 3 Drawing Sheets

(51) Int. Cl.
  *G03B 21/00* (2006.01)
  *H04N 9/31* (2006.01)
  *G03B 21/20* (2006.01)
  *G02B 27/01* (2006.01)
(52) U.S. Cl.
  CPC ....... *G03B 21/008* (2013.01); *G03B 21/2066* (2013.01); *H04N 9/3102* (2013.01)
(58) Field of Classification Search
  CPC .......... G02B 21/28; G02B 27/01; G02B 5/04; G02B 27/0101; H04N 9/31; H04N 9/3102
  See application file for complete search history.

(56) References Cited

U.S. PATENT DOCUMENTS

| | | | | |
|---|---|---|---|---|
| 2005/0237621 | A1* | 10/2005 | Peterson | G02B 5/04 359/618 |
| 2005/0275959 | A1* | 12/2005 | Kawaai | G02B 5/04 359/834 |
| 2007/0019165 | A1* | 1/2007 | Ishikura | G02B 5/04 353/33 |
| 2010/0238413 | A1* | 9/2010 | Huang | G03B 21/28 353/33 |
| 2013/0229629 | A1* | 9/2013 | Kawamoto | H04N 9/31 353/30 |
| 2013/0242272 | A1* | 9/2013 | Baba | G03B 21/008 353/81 |
| 2014/0118701 | A1* | 5/2014 | Lee | G03B 21/28 353/34 |
| 2015/0212324 | A1* | 7/2015 | Osterhout | G06F 5/10 345/8 |

FOREIGN PATENT DOCUMENTS

| | | |
|---|---|---|
| JP | 2012137679 A | 7/2012 |
| JP | 2014041315 A | 3/2014 |
| WO | 2016034867 A1 | 3/2016 |

OTHER PUBLICATIONS

International Search Report and Written Opinion received for Patent Application No. PCT/GB2015/052517, dated Nov. 26, 2015. 10 pages.

GB Intellectual Property Office Search Report under Section 17(5) received for GB Patent Application No. 1415632.7 dated Feb. 20, 2015. 3 pages.

* cited by examiner

DMD PROJECTOR WITH TIR PRISM

FIELD OF THE INVENTION

The invention relates to displays such as, but not limited to, projection displays for projecting display light.

BACKGROUND

The total internal reflection (TIR) if illumination light within a prism is a known method of directing illumination light on to a DMD (digital micro-mirror device) for use in reflecting that light as a projectable display. By selectively separating the light reflected from DMD pixels, one may control what light is projected, and when. A prism may be used in this way to exploit total internal reflection (TIR) to direct "selected" light and "deselected" light through different exit faces of the prism. This allows the projector system to keep "de-selected" light out of a subsequent projector lens.

The drawback with this is the required increase in build cost and complexity, especially since these prisms are bespoke optical elements. Another drawback occurs when multi-element prism assemblies are employed in an attempt to suitably direct light. In particular, this is the introduction of multiple air-gaps in the path downstream of the DMD, which degrade the projected image resolution. In general these should be minimised.

The present invention aims to address these matters with a compact, low-cost and lower-complexity optical design.

BRIEF DESCRIPTION

In a first aspect, the invention provides a projection apparatus comprising a prism assembly including an input sub-prism possessing a first interface surface (preferably not a base of the prism) and an output sub-prism adjacent to the input sub-prism possessing a second interface surface (preferably not a base of the prism) spaced apart from the first interface surface in immediate proximity thereto so as to extend thereover to receive display light transmitted through the first interface surface. The apparatus includes a panel comprising a plurality of selectively adjustable reflecting elements arranged to receive from the input sub-prism an illumination light totally internally reflected from the first interface surface and selectively to reflect received illumination light back through the input sub-prism for transmission through the first interface surface for receipt as display light by the output prism at said second interface surface.

The input sub-prism possesses a base surface that is substantially congruent (e.g. substantially identical in shape and area) to a matching base surface of the second sub-prism.

This gives economies of manufacture since a single type of sub-prism element may be manufactured, of which two are used in each finished assembly. Preferably, the input and output sub-prisms share common face angles. The (e.g. glass) material of the input and output sub-prisms are preferably common to both. The use of two sub-prism pieces in this way may form a 2-piece compound TIR prism. The constituent (e.g. glass) pieces may be substantially identical in material, and/or size and/or shape. This has the advantage of naturally being able to equalize the optical paths for light passing through both sub-prisms. This represents a best compromise between performance and ease of manufacture. The output sub-prism preferably serves as a path-equalising element for light that has been reflected by the panel into the input sub-prism and subsequently output from the input sub-prism, in use. This is preferably applied to light intended to be projected, (e.g. "on-state" light) as discussed below. Equalisation of the optical path length of such light is preferably to reduce or remove optical distortions that could otherwise be present in the light output from the input sub-prism by optical refraction at the prism output surface. The panel may be arranged to reflect light into the input sub-prism in a direction substantially perpendicular to the facing surface of the input sub-prism. The panel may be arranged to reflect light in a direction substantially perpendicular to the plane of the panel. For example, a cone of light may be so reflected that the central axis of the light cone is directed in this way—albeit that the peripheral rays at the edge of the light cone may not be quite perpendicularly directed.

The input sub-prism and the output sub-prism may be cuttings from a common master prism. The master prism may be cut transversely to the axis joining the two congruent surfaces (bases) of the prism to provide a plurality of sub-prisms for use as the input sub-prism and output sub-prism. This has the benefit that the non-base surfaces of the input and output sub-prisms are fully matched in the sense that they share a common set of internal angles between contiguous adjacent non-base surfaces of each prism—those angles being defined by the internal angles of the master prism. As a result, it is far easier to provide a suitably matched pair of sub-prisms as compared to other designs which may employ two prisms of differing shape. Furthermore, provided that the master prism is machined to suitable accuracy, then so too are all of the sub-prisms cut from it. This reduces errors and also reduces the manufacturing cost and complexity.

The master prism may be cut such that the aforesaid two matching substantially congruent surfaces are formed, revealed or generated by the same cutting act performed upon a master prism. Of course, the master prism may be an elongate triangular prism which may have been cut transversely across its elongate axis at several separate locations thereby to provide more than two sub-prisms and the input sub-prism and output sub-prism need not have originated from neighbouring portions of the elongate master prism.

Optical coating(s) may be applied to surfaces of the two sub-prisms. Examples include anti-reflective coatings at surfaces intended, in use, to transmit light. Alternatively, or in addition, reflective coatings may be applied to surfaces intended, in use, to reflect light. In some examples, differing or identical optical coatings (e.g. identical in position/extent and/or material/structure) may be applied to the two sub-prisms if desired. The optical coatings are preferably applied to a sub-prism(s) before assembly into the compound TIR prism.

The input sub-prism preferably has a face parallel to the panel, and it may have another relatively inclined face which functions as a surface at which TIR occurs, in use, to direct illumination light to the panel.

Preferably, the output sub-prism is positioned over the input sub-prism with a minimal air gap sufficient to maintain TIR at the first interface surface. Preferably the first and second interface surfaces are substantially parallel.

The air gap size is most preferably large enough to prevent evanescent wave coupling between the opposing surfaces of the two sub-prisms. Such a coupling would degrade TIR and could result in a breakdown in TIR. The penetration depth of an evanescent wave, in these circumstances, depends on the ingle of incidence of light to the prism surface in question. Preferably, minimum air gap of 5λ should be desirable, where λ is the longest optical wavelength in use. This longest wavelength may be in the infrared. The 5λ air gap preferably permits efficient reflection of incident light up to a fraction of a degree from the critical angle for TIR. A smaller air gap size may be used, but this should preferably be associated with a larger safety margin in the angle of incidence, i.e. rays close to the critical angle for TIR may to some extent couple into the second sub-prism. The air gap may introduce some degree of aberration in the light that is reflected from the panel for projection, so it is preferable to keep the air gap to a minimum. The maximal size of the air gap depends to some extend on the expected resolution of the optical system, but it should preferably not exceed 20λ.

The input sub-prism preferably has a substantially plane panel-facing surface relative to which the first interface surface is inclined and which faces in a direction towards the panel for receiving said reflected illumination light therefrom. The output sub-prism preferably has a substantially plane output surface for outputting the display light from the prism assembly wherein the output surface is inclined relative to second interface surface and is substantially parallel to the panel-facing surface thereby substantially to equalize the optical paths of light passing from the panel-facing surface to the output surface through different respective parts of the first and second interface surfaces.

Preferably, a non-base surface of the input sub-prism defines an input surface for receiving said illumination light into the input sub-prism from an illumination light source, wherein the input surface is inclined relative to the first interface surface such that illumination light incident at the input surface at an incidence angle within a first range of incidence angles consistent with an acceptance cone angle of the panel is subsequently incident at the first interface surface at an incidence angle within a second range of incidence angles suitable to cause total internal reflection thereat towards the panel. The centre of the angular range of the first range of incidence angles at the input surface may preferably correspond to the perpendicular to the input surface.

The panel may be arranged selectively to reflect received illumination light back through the input sub-prism in a direction relative to the prism assembly which substantially minimises the angular deviation of light along its optical path through the prism assembly.

The panel is preferably arranged to reflect received illumination light in any selected one of two different input directions relative to the prism assembly such that display light is consequently output from the prism assembly in a respective one of two different output directions relative to the prism assembly thereby selectively to spatially separate light to permit light associated with a selected use to be assigned to a selected said output direction.

The panel may comprise a digital micro-mirror device (DMD) device. A DMD is a known device comprising a combination of opto-mechanical and electro-mechanical parts combined to control the orientation of each element of an array containing a plurality of reflective elements (sometimes referred to as "pixels"). Any one such pixel may operate as described herein, for understanding, and the entire array of pixels that comprise a DMD may be controlled accordingly by controlling pixels individual as desired.

Each reflective element of a DMD may comprise a mirror (pixel) comprising both an opto-mechanical part and an electro-mechanical part via which the orientation of the mirror relative to the plane of the array of pixels of the DMD is bi-stably controlled to selectively occupy one of two pre-determined orientations. For example, each DMD mirror (pixel) may have two stable mirror states oriented at e.g. +12 degrees and −12 degrees relative to the perpendicular to the plane of the DMD panel (other bi-stable angular orientations may be used). These two positions determine the direction that illuminating light incident upon the DMD panel, is deflected by each pixel. In this sense, a DMD is a spatial light modulator. By convention, the positive (+) orientation state is tilted toward the illumination and is referred to as the "on state". Similarly, the negative (−) orientation state is tilted away from the illumination and is referred to as the "off state". FIG. 6 shows a DMD pixel in the "on" and "off" states, and FIG. 4 (discussed in detail below) shows the effects of each such state upon the deflection of illumination light incident upon a single pixel (for clarity). It will be understood that this effect is replicated separately and individually by each pixel within the DMD panel of FIG. 4. Examples of a suitable DMD device are available from Texas Instruments Inc. in the USA, or other well-known manufacturers of DMDs.

The projection apparatus may include an optical monitor arranged for receiving light assigned to one of said two different output directions and to generate a monitoring signal according to said received light, for use in monitoring the operation of the panel. The optical monitor may use a wavelength of light (e.g. in the Infra-Red) that is different to the wavelength of light (e.g. visible) used for projection. The optical monitor may be arranged to receive light deflected by the reflective panel (e.g. DMD) having the larger deviation from the input direction to the panel (i.e. the "off-state" light). The optical monitor may be responsive to light a different wavelength (or range of wavelengths) to the light projected by the apparatus (e.g. reflected light which is substantially perpendicular to the prism surface adjacent to the panel i.e. the "on-state" light).

The reflected light for projection may comprise of a range of wavelengths derived from a range of different light sources. The prism material, prism angles and coatings, in any embodiment, may be chosen to be compatible with operation with a light source operating in the ultraviolet.

The first interface surface may be the largest non-base surface of the input sub-prism. The output surface is preferably the largest non-base surface of the output sub-prism. The input surface is preferably the second-largest non-base surface of the input sub-prism. This arrangement helps reduce the distance between the input and output surfaces of the input and output sub-prisms, respectively, so that the prism assembly is thinner in that dimension. This improves compactness and also means that if an optical lens (e.g. a collimating lens of a projection lens) is employed to receive display light output form the output surface, then that lens may possess a smaller back-focal length. The projection apparatus may include an optical lens arranged to receive display light output form the output surface. The lens may be adjacent to the prism assembly (e.g. immediately so, or at least the next optical element following the prism assembly). Furthermore, the relatively large size of the output surface means that de-selected ("off-state") light may be directed by the panel for output through a separate region thereby avoiding or reducing the extent of internal reflections required within the output prism in order to attain a suitable output direction away from that of the "selected" ("on-state") light. Monitoring apparatus may be positioned adjacent to, or in in optical communication with, the output surface thereby allowing it to be monitored to monitor the operation/performance of the panel.

The substantially congruent surfaces of the input sub-prism and/or of the output sub-prism are preferably substantially parallel.

The plane of each non-base surface of each of the input sub-prism and the output sub-prism is preferably substantially perpendicular to the plane of each substantially congruent surface thereof.

Preferably, each of the input sub-prism and the output sub-prism is a triangular prism having two triangular substantially congruent base surfaces separated by three contiguous sides defining the non-base surfaces of the respective sub-prism.

The input sub-prism may be substantially identical in shape and size to the output sub-prism.

In a second aspect, the invention may provide a head-up display comprising a projection apparatus as described above. The invention may provide a head-up display (HUD) apparatus (e.g. for a vehicle) comprising a projection apparatus as described above.

In a third aspect, the invention may provide a method of projection comprising providing a prism assembly including an input sub-prism possessing a first interface surface (preferably not a base of the prism) and an output sub-prism adjacent to the input sub-prism possessing a second interface surface (preferably not a base of the prism) spaced apart from the first interface surface in immediate proximity thereto so as to extend thereover to receive display light transmitted through the first interface surface. The method includes providing a panel comprising a plurality of selectively adjustable reflecting elements, and receiving at the panel an illumination light from the input sub-prism by total internal reflection from the first interface surface and selectively reflecting the received illumination light back through the input sub-prism and through the first interface surface to the second interface surface. The method also includes outputting the reflected illumination received light from the output sub-prism as display light. The input sub-prism possesses a base surface that is substantially congruent (e.g. identical in shape and area) to a matching base surface of the output sub-prism.

The method preferably comprises controlling said panel to selectively reflect said received illumination light back through the input sub-prism in a direction relative to the prism assembly which substantially minimises the angular deviation of light along its optical path through the prism assembly.

The method may comprise reflecting received illumination light at said panel in any selected one of two different input directions relative to the prism assembly such that display light is consequently output from the prism assembly in a respective one of two different output directions relative to the prism assembly thereby selectively to spatially separate light to permit light associated with a selected use to be assigned to a selected said output direction.

BRIEF DESCRIPTION OF THE DRAWINGS

A detailed description of one exemplary implementation of the invention follows, which is not intended to be a limitation upon the scope of the invention, and is provided here to aid an understanding of the invention. The detailed description is made with reference to the following drawings of which.

DETAILED DESCRIPTION

Figure 1:
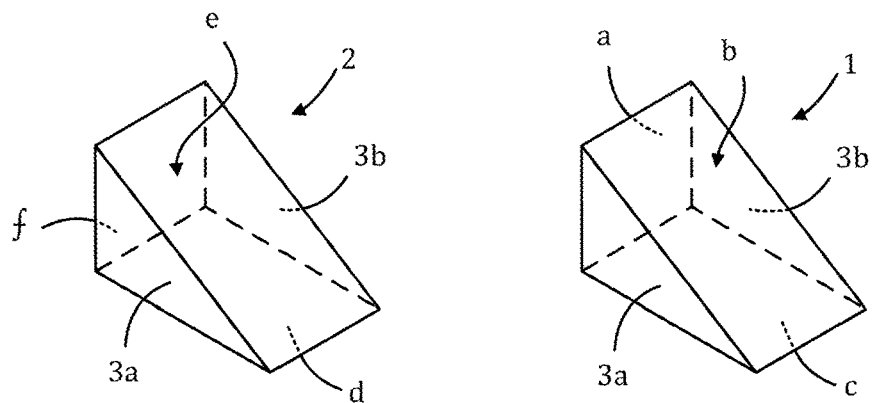
FIG. 1 illustrates a pair of substantially identical substantially congruent prisms.

In the drawings, like items are assigned like reference symbols.

FIG. 1 illustrates two substantially identical triangular prism pieces (1, 2). Each prism piece is a triangular prism having three non-base surfaces (a, b, c; d, e, f) extending between a respective parallel pair of triangular, substantially congruent "base" surfaces (3a, 3b). Each prism piece has the following three internal angles of 97.2°, 49.5° and 33.3°. In each prism piece, a smallest of the three non-base surfaces (a, f) joins the largest non-base surface (b, e) at an internal angle of 49.5°, and joins the remaining (second-largest) non-base surface (c, d) at an internal angles of 97.2°. Thus, in each prism, the largest and second largest non-base surfaces meet at an internal angle of 33.3°. It will be appreciated that these angles will change if the refractive index of the material of the prism is changed.

Figure 2:
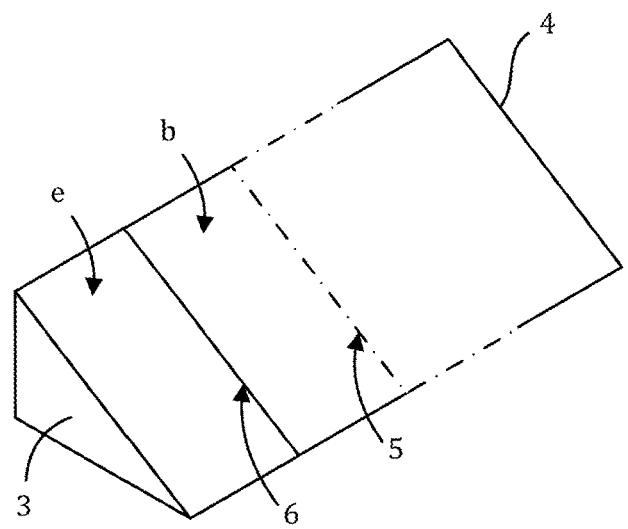
FIG. 2 schematically illustrates an elongate master prism and the places at which it is transversely cut to produce the two prisms of FIG. 1.

In this example, each prism piece is made from the common Schott borosilicate glass N-BK7, but other types of glass may be used, or even other materials, which have a different refractive index and, thus, different prism angles to achieve the same effect. The pieces are 30 mm wide i.e. between the triangular base surfaces. They are formed as cuttings from a common master prism piece 4 shown schematically in FIG. 2. The master prism is elongate in the direction perpendicular to its triangular base surfaces 3. A first of the two prism pieces 1, is made by cutting the master prism in a direction perpendicular to its elongate axis (i.e. parallel to the base surface 3) along the cut line 6 shown. This cut line is spaced 30 mm from the base surface 3 and, by action of this cutting releases the first prism piece from the master prism. Repeating this operation at the second cut line 5, spaced 30 mm from the first cut line, releases the second prism piece 2. This may be continued to release further prism pieces as desired.

In this way, one master prism may be the source of each of the two prism pieces. This ensures that the two prism pieces are closely matching (e.g. substantially identical) in terms of their internal angles, surfaces and glass material. A prism assembly 7 is formed from these two prism pieces as schematically shown in FIG. 3, by placing the second-largest non-base surface (d) of one prism piece 3a over the largest non-base surface (b) of the other prism piece in close, but spaced-apart parallel adjacency to define an air gap 100.

Prior to assembling the prism assembly in this way, a first prism 1 is coated on all non-base surfaces a, b and c with an anti-reflective optical coating, while the other prism 2 is coated with an anti-reflective optical coating on all non-base surfaces d, f and e, wherein the area of the largest non-base surface of that prism (surface e) adjacent to the smallest non-base surface (f) may, in some embodiments, be coated with a reflective optical coating there. That reflectively-coated region may be the region through which light reflected from a DMD panel is arranged to pass when not intended for display (e.g. "off-state" light). This arrangement may serve to internally reflect the "off-state" light back from the prism surface e so as to exit that prism 2 through its smallest non-base surface (f). Conversely, the remaining regions the area of the largest non-base surface of that prism (surface e) may be coated with an anti-reflective coating intended to transmit light to be displayed. The anti-reflective (AR) coatings may be interference-type optical coatings such as would be readily apparent to the skilled person. They aim to enhance transmission of light through surfaces of a respective prism intended to transmit light, thereby reducing unwanted internal partial reflections of light that may degrade image quality in the projected/displayed light. The optional reflective coating may be any suitable coating such as would be readily available to the skilled person.

The AR coatings are preferably tailored for the angles of incidence of light required for each coated surface, and so the coating may be different on different surfaces within the apparatus. For example, at the two opposing interface surfaces there may be, in use, a cone of 'on state' light incident upon the surface. The centre of the cone of light may be, for example, incident at an angle of 33.3° from the normal to the surface. Coating designs are typically specified in the direction of air to glass. In this example, one may calculate the incidence angles that the edges of the cone in the air gap (using Snell's law). Thus, for example, if the light cone has a full angle of 22°, then one may calculate the angle for 33.3°±11°. In other cases the angles may be different. An example of an AR coating may comprise a single dielectric layer of Magnesium Fluoride, with a thickness of $\lambda/2$, where $\lambda$ is the optical wavelength in respect of which the coating is designed. The coating may comprise of a stack of dielectric layers of the same thickness or of comparable thicknesses e.g. within or around the same order of magnitude. Details of the coating will depend on the design requirements for each surface, and design options would be readily apparent to the skilled person. The reflective coating may comprise a metallic coating of aluminum with a protective layer of Magnesium Fluoride. The metal layer is preferably greater than 50 nm in thickness.

Figure 3:
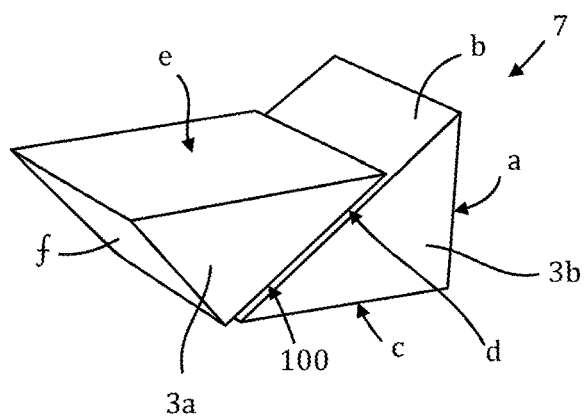
FIG. 3 illustrates a prism assembly having a narrow air gap between the two prisms of FIG. 1 to allow TIR from one of the two opposing surfaces of the two prisms.
Figure 4:
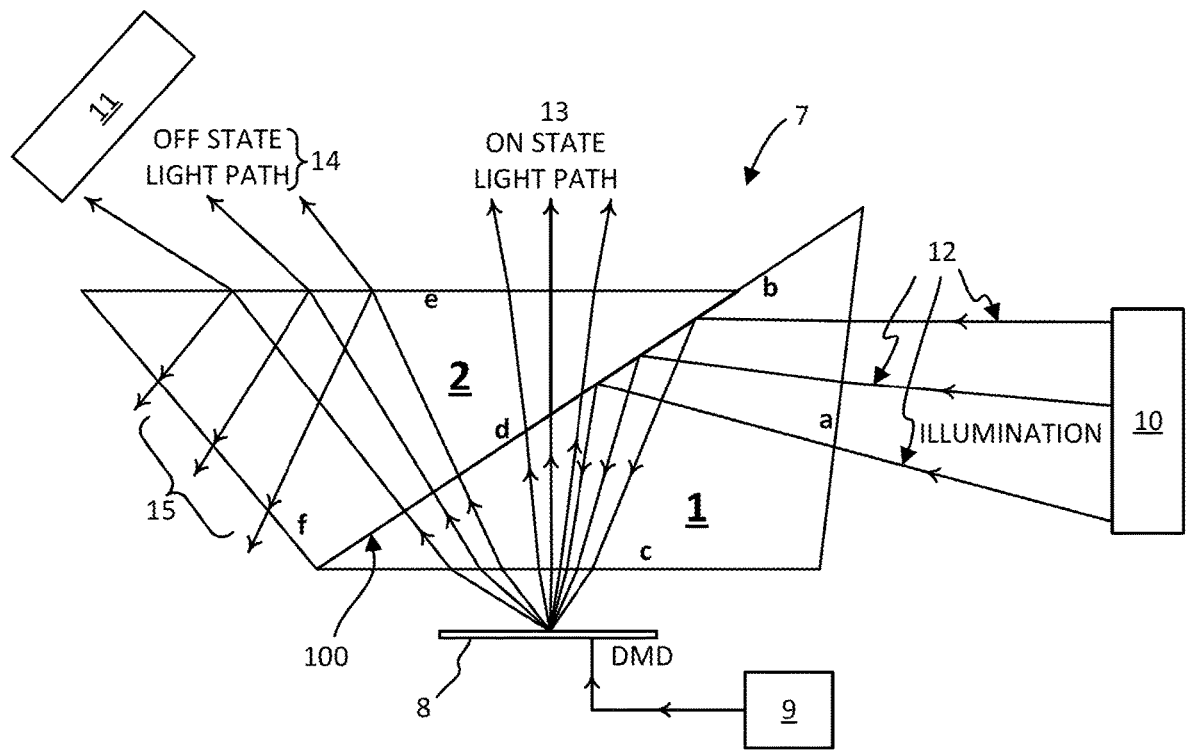
FIG. 4 schematically shows a projection apparatus comprising the prism assembly of FIG. 4, in which light paths are indicated to represent different paths of light reflected from a digital micro-mirror device (DMD)

FIG. 4 schematically illustrated a projection apparatus according to an embodiment of the invention, comprising a prism assembly 7 as shown in FIG. 3. The apparatus includes a digital micro-mirror device (DMD) panel 8 arranged adjacent to the second largest non-base surface (c) of the first prism piece 1, with the plane of the DMD panel substantially parallel to that of the surface it faces. A controller unit 9 is connected to the DMD panel and is arranged to control the orientation of each reflective pixel element of the DMD.

Each pixel of the DMD has a mirror connected to an electro-mechanical part via which the orientation of the mirror relative to the plane of the array of pixels of the DMD is bi-stably controlled from the controller unit 9 to selectively occupy one of two pre-determined orientations. In particular, each DMD mirror has two stable mirror states oriented at e.g. +12 degrees and −12 degrees relative to the perpendicular to the plane of the DMD panel (other bi-stable angular orientations may be used, e.g. +/−17 degrees). These two positions determine the direction that illuminating light incident upon the DMD panel, is deflected by each pixel. In this sense, the DMD is controllable by the controller unit 9 to spatially modulate illumination light 12 as desired, for display.

Figure 6:
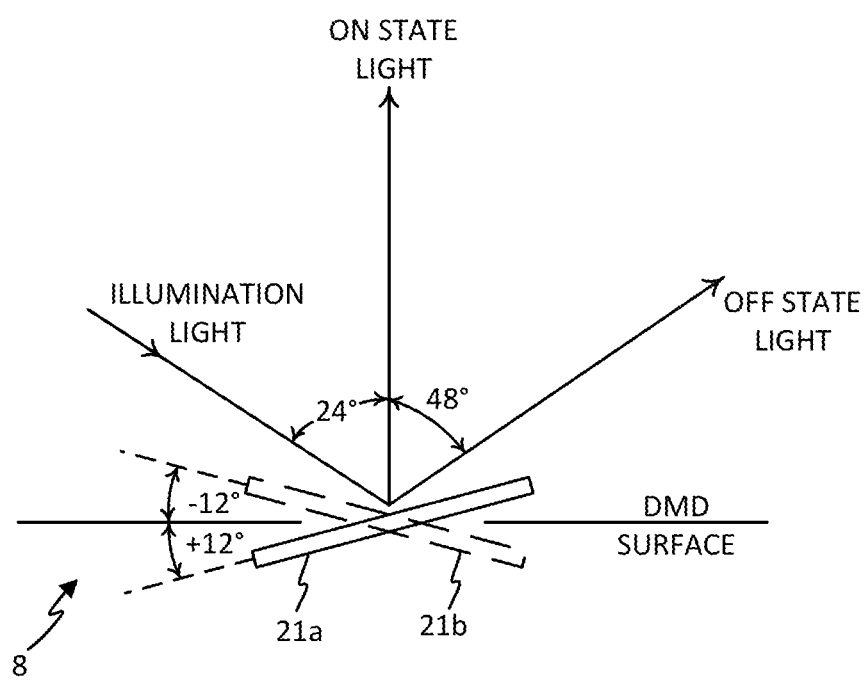
FIG. 6 schematically illustrates the bi-stable states of a DMD.

FIG. 6 illustrates schematically the bi-stable operation of each mirror (pixel) of the DMD panel 8 in response to control signals from the controller unit 9. A positive (+) orientation state 21a of a mirror tilts the mirror toward the illumination light and is referred to as the "on state" of the mirror (pixel). Similarly, the negative (−) orientation state 21b of the mirror tilts it away from the illumination light and is referred to as the "off state". FIG. 6 shows a DMD pixel in the "on" and "off" states, and FIG. 4 shows the effects of each such state upon the deflection of illumination light incident upon a single pixel (for clarity). It will be understood that this effect is replicated separately and individually by each pixel within the DMD panel of FIG. 4. The DMD panel is arranged such that "on-state" light is reflected from the panel in a direction substantially perpendicular to the panel, and thus, also perpendicular to the opposing face of the first prism piece 1.

The prism assembly is arranged to be illuminated by a cone of light 12, generated by an illumination light source 10, which possesses a cone axis substantially directed normal to the smallest non-base surface (a) of the prism. The illumination light transmitted through this input surface reaches the largest non-base surface (b) of that prism internally. There, due to the prism shape, and internal angles, it is reflected by total internal reflection (TIR) towards the second-largest non-base surface of the first prism (c) and the DMD panel opposing it. In this way, the TIR illumination light is caused by the first prism to illuminate the DMD.

This reflected light exits the first prism piece through the surface (c) opposing the DMD panel, reaches the DMD panel, and is modulated by the DMD mirror (pixel) array in a manner determined by the controller unit 9.

Light reflected by the DMD panel, both in the "on-state" and the "off-state" re-enters the first prism piece by transmission through the opposing surface (c) of that prism. The rays of "on-state" light enter the first prism piece substantially perpendicular to that opposing prism surface whereas rays of "off-state" light enter it substantially obliquely and at a different surface location—due to the separation between the DMD panel and the opposing surface of the first prism piece.

Subsequently light rays of both "on-state" and "off-state" light traverse the first prism piece 1 towards the largest non-base surface (b) thereof, in different, divergent directions. This non-base surface (b) of the first prism piece is oppose by the second-largest non-base surface (d) of the second prism piece 2 across a uniform air gap 100. These two opposing surfaces define respectively a first interface surface and a second interface surface via which the first and second prism pieces optically communicate.

The orientation of "on-state" light relative to the first and second (parallel) interface surfaces means that TIR of that light does not occur at the first interface surface (b). Thus, "on-state" light rays thereby pass through both of the two interface surfaces (b, d) and onward to the largest non-base surface (e) of the second prism piece 2, which defines the output surface of the prism assembly. There, the transmitted "on-state" light rays 13 exit the prism assembly for display. They may pass to other optical elements such as a projection lens system (16, FIG. 5). The 'on-state' aperture through both of the two prism pieces may be about 35 mm long. This allows the assembly to be used with a 0.9 inch DMD with square pixels.

The parallel orientation of the DMD panel-facing prism surface (c) and the output prism surface (e), together with the parallel orientation of the first and second interface surfaces (b, d), allows light from "on-state" DMD pixels to be viewed normal to the output surface (e) of the prism assembly, while directing light 14 from "off-state" pixels away from that viewing angle. In particular, the orientation of "off-state" light relative to the first and second (parallel) interface surfaces means that TIR of that light does not occur at the first interface surface (b). Thus, "off-state" light rays thereby pass through both of the two interface surfaces (b, d) and onward to the largest non-base surface (e) of the second prism piece 2, which defines the output surface of the prism assembly. There, the transmitted "off-state" light rays 14 exit the prism assembly and are detected by an optical sensor and monitor 11 arranged e.g. to compare the detected spatial pattern/modulation of "off-state" light with the expected pattern and to generate an error signal indicating a deviation from the expected pattern. This may be used to monitor and detect errors or malfunctions in the DMD panel.

In alternative embodiments, a reflective optical coating is formed upon those parts of the output surface (e) to which the DMD is controlled to direct "off-state" light such that "off-state" light rays reaching that coating are reflected internally within the second prism piece away from the output surface and towards the smallest non-base surface (f) of the second prism piece 2 whereupon they exit the prism assembly as outgoing rays 15 for detection by an optical sensor and monitor 11 as described above.

In a further embodiment, the optical sensor and monitor 11 may be replaced by a light-absorbing part for adsorbing the "off-state" light.

It is to be noted that the TIR angle does not change due to the presence of an optical coating at a reflecting surface/interface. This is due to Snell's Law, where the quantity n sin θ is conserved in each medium (n is the refractive index of the medium, and θ the angle of light relative to the normal to the reflecting surface). If light reaches an interface at an angle that would represent the critical angle for TIR at a glass/air interface, then n sin θ=1. If the next medium is another glass or dielectric with n>1, the light will pass through the interface. If the light then meets another interface between this second medium and air, the condition n sin θ=1 will still be true, so total internal reflection will occur. When the light passes back into the original glass, it will return to the original angle and so it will behave, to this extent, as if the second medium is not present.

In this way, the embodiment provides a projection apparatus comprising the prism assembly including the first prism piece 1 as an input sub-prism possessing a first interface surface (b) and the second prism piece 2 as an output sub-prism adjacent to the input sub-prism possessing a second interface surface (d) spaced apart from the first interface surface in immediate proximity thereto so as to extend thereover to receive display light 13 transmitted through the first interface surface. The apparatus includes a DMD panel comprising a plurality of selectively adjustable reflecting elements arranged to receive from the input sub-prism 1 an illumination light 12 totally internally reflected from the first interface surface b and selectively to reflect received illumination light back through the input sub-prism 1 for transmission through the first interface surface (b) for receipt as display light 13 by the output prism 2 at the second interface surface (d). The input sub-prism 1 possesses a base surface 3a that is substantially congruent (e.g. substantially identical in shape and area) to a matching base surface 3b of the second sub-prism.

It is to be noted that the choice of prism (internal) angles of the sub-prisms may be influenced by the properties of the reflective panel (e.g. the DMD in this example), both in terms of the acceptance cone of the input light and the deflection angle of the reflective panel (e.g. DMD mirrors). The skilled reader will appreciate that variations in, or alternatives to, the embodiment illustrated here may be made without departing from the scope of the invention.

In the present embodiment of the invention, the monitoring of the off-state light (sensor and monitor unit 11) may use a wavelength of light (e.g. in the Infra-Red) that is different to the wavelength of light (e.g. visible) used for projection. The projector apparatus, in any embodiment, may therefore comprise an optical monitor arranged to receive light deflected by the reflective panel (e.g. DMD) having the larger deviation from the input direction to the panel (i.e. the "off-state" light), wherein the optical monitor is responsive to light a different wavelength (or range of wavelengths) to the light projected by the apparatus (e.g. reflected light which is substantially perpendicular to the prism surface adjacent to the panel i.e. the "on-state" light)."

The reflected light for projection, (e.g. which is substantially perpendicular to the prism surface adjacent to the panel i.e. the "on-state" light), in any embodiment, may comprise of a range of wavelengths derived from a range of different light sources.

The prism material, prism angles and coatings, in any embodiment, may be chosen to be compatible with operation with a light source operating in the ultraviolet.

The present embodiment uses a type of illumination which is known as "critical illumination" or "Abbé illumination". In this case the illumination source, or a surface in the illumination system, is imaged onto the DMD. An alternative embodiment may employ light from the source which is substantially collimated. This is known as "Köhler illumination". The choice of illumination does not affect the way the prisms and DMD operate.

Alternative DMD designs may be employed in alternative embodiments. The projector apparatus may employ a DMD arranged such that the light output/reflected by it having the larger deviation from the input to the panel, the "off-state" light, may be reflected out of the plane defined by the input light and the reflected light which is substantially perpendicular to the prism surface adjacent to the panel (the "on-state" light)."

Figure 5:
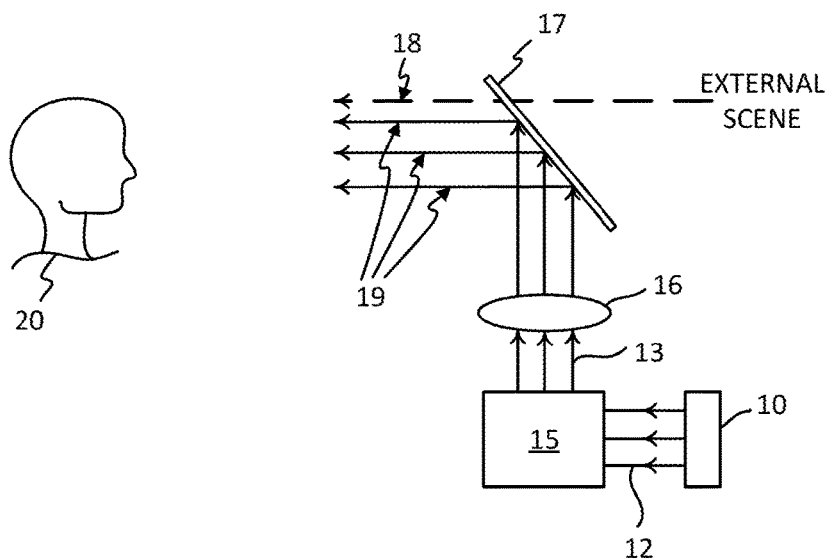
FIG. 5 schematically illustrates a head-up display (HUD) comprising a projector apparatus according to FIG. 4.

FIG. 5 schematically illustrates a head-up display (HUD) comprising a projection apparatus 15 according to FIG. 4. The HUD further includes the illumination light source 10 and a projection lens unit 16 arranged to receive "on-state" light from the projection apparatus and to collimate that light for projection onto a surface of an optical combiner unit 17 for reflection there at to a viewer 20 as projected display light 19 combined by the combiner unit with light 18 from an external scene. In this way, light 18 from an external scene maybe viewed together with an overlay image of the light 19 projected from the projection apparatus 15. The combiner is a partially optically transmissive sheet through which an external view is visible by partial transmission of light therefrom, and which is adapted concurrently to partially reflect towards a viewer 20 the "on-state" light provided by the projection apparatus 15. Thus HUD may be provided within a vehicle, such as within an the cockpit of an aircraft or within the cabin of another vehicle type etc.

The embodiments described above are for illustrative purposes and modifications, variants and all equivalents thereto, such as would be readily apparent to the skilled person, are encompassed within the scope of the invention, such as is defined by the claims for example.

The invention claimed is:

1. A projection apparatus comprising:
   a prism assembly including an input sub-prism possessing a first interface surface and an output sub-prism adjacent to the input sub-prism possessing a second interface surface spaced apart from the first interface surface in immediate proximity thereto so as to extend thereover to receive display light transmitted through the first interface surface; and
   a panel comprising a plurality of selectively adjustable reflecting elements arranged to receive from the input sub-prism an illumination light totally internally reflected from the first interface surface and selectively to reflect received illumination light back through the input sub-prism for transmission through the first interface surface for receipt as display light by the output sub-prism at said second interface surface;
   wherein a first base surface of the input sub-prism is perpendicular to the first interface surface of the input sub-prism, and a second base surface of the output sub-prism is perpendicular to the second interface surface of the output sub-prism,
   wherein the first base surface of the input sub-prism is substantially congruent to the second base surface of the output sub-prism,
   wherein while the projection apparatus is in an on state, the adjustable reflecting elements are adjusted to reflect the illumination light totally internally reflected from the first interface surface back through the input sub-prism in a first direction, such that on-state illumination light exits from the output sub-prism through a first output surface, and
   wherein while the projection apparatus is in an off state, the adjustable reflecting elements are adjusted to reflect the illumination light totally internally reflected from the first interface surface back through the first interface surface of the input sub-prism in a second direction and then through the second interface surface of the output sub-prism, such that at least part of off-state illumination light subsequently gets internally reflected from the first output surface of the output sub-prism and exits the output sub-prism through a second output surface, the first output surface being different from the second output surface.

2. The projection apparatus according to claim 1 in which the input sub-prism has a substantially plane panel-facing surface relative to which the first interface surface is inclined and which faces in a direction towards the panel for receiving said reflected illumination light therefrom, and the output sub-prism has the substantially plane first output surface for outputting said display light from the prism assembly, wherein the first output surface is inclined relative to the second interface surface and is substantially parallel to the panel-facing surface thereby substantially to equalize the optical paths of light passing from the panel-facing surface to the first output surface through different respective parts of the first and second interface surfaces.

3. The projection apparatus according to claim 1 in which a non-base surface of the input sub-prism defines an input surface for receiving said illumination light into the input sub-prism from an illumination light source, wherein the input surface is inclined relative to the first interface surface such that illumination light incident at the input surface at an incidence angle within a range of incidence angles consistent with an acceptance cone angle of the panel is subsequently incident at the first interface surface at an incidence angle within a range of incidence angles suitable to cause total internal reflection thereat towards the panel.

4. The projection apparatus according to claim 1 in which the panel is arranged selectively to reflect received illumination light back through the input sub-prism in a direction relative to the prism assembly which substantially minimizes the angular deviation of light along its optical path through the prism assembly.

5. The projection apparatus according to claim 1 in which the panel is arranged to reflect received illumination light in any selected one of the first or second directions relative to the prism assembly such that display light is consequently output from the prism assembly in a respective one of two different output directions relative to the prism assembly, thereby selectively to spatially separate light to permit light associated with a selected use to be assigned to a selected said output direction.

6. The projection apparatus according to claim 5 including an optical monitor arranged for receiving light assigned to one of said two different output directions and to generate a monitoring signal according to said received light, for use in monitoring the operation of the panel.

7. The projection apparatus according to claim 1 in which the first interface surface is the largest non-base surface of the input sub-prism.

8. The projection apparatus according to claim 1 in which the first output surface is the largest non-base surface of the output sub-prism.

9. The projection apparatus according to claim 1 in which the substantially congruent first and second base surfaces are substantially parallel.

10. The projection apparatus according to claim 1 in which each of the input sub-prism and the output sub-prism is a triangular prism having two triangular substantially congruent base surfaces separated by three contiguous sides defining the non-base surfaces of the respective sub-prism.

11. The projection apparatus according to claim 1 in which the input sub-prism is substantially identical in shape and size to the output sub-prism.

12. A head-up display comprising the projection apparatus according to claim 1.

13. A projection apparatus comprising:
    a prism assembly including an input sub-prism possessing a first interface surface and an output sub-prism adjacent to the input sub-prism possessing a second interface surface spaced apart from the first interface surface in immediate proximity thereto so as to extend thereover to receive display light transmitted through the first interface surface; and
    a panel comprising a plurality of selectively adjustable reflecting elements;
    wherein an illumination light is received at the panel from the input sub-prism by total internal reflection from the first interface surface, and the received illumination light is selectively reflected back through the input sub-prism and through the first interface surface to the second interface surface;
    wherein the reflected illumination received light is output from the output sub-prism as display light;
    wherein the input sub-prism and the output sub-prism each have two parallel base surfaces;
    wherein at least one of the base surfaces of the input sub-prism is substantially congruent to at least one of the base surfaces of the output sub-prism, the at least one of the base surfaces of the input sub-prism and the at least one of the base surfaces of the output sub-prism are respectively perpendicular to the first interface surface and the second interface surface;

wherein while the projection apparatus is in an on state, the adjustable reflecting elements are adjusted to reflect the illumination light totally internally reflected from the first interface surface back through the input sub-prism in a first direction such that on-state illumination light exits the output sub-prism through a first area of an output surface of the output sub-prism; and wherein while the projection apparatus is in an off state, the adjustable reflecting elements are adjusted to reflect the illumination light totally internally reflected from the first interface surface back through the first interface surface of the input sub-prism in a second direction such that off-state illumination light exits the output sub-prism through a second area of the output surface of the output sub-prism, the first area being different from the second area.

14. The projection apparatus according to claim 13, further comprising a controller for controlling said panel to selectively reflect said received illumination light back through the input sub-prism in a direction relative to the prism assembly which substantially minimizes the angular deviation of light along its optical path through the prism assembly.

15. The projection apparatus according to claim 13, wherein received illumination light at said panel is reflected in any selected one of the first or second directions relative to the prism assembly such that display light is consequently output from the prism assembly in a respective one of two different output directions relative to the prism assembly thereby selectively to spatially separate light to permit light associated with a selected use to be assigned to a selected said output direction.

16. A projection apparatus comprising:
a prism assembly including (i) a first sub-prism possessing a first interface surface, and (ii) a second sub-prism possessing a second interface surface that is adjacent to the first interface surface of the first sub-prism; and a panel comprising a plurality of selectively adjustable reflecting elements arranged to receive from the first sub-prism an illumination light totally internally reflected from the first interface surface;

wherein while the projection apparatus is in an off state, the panel is to reflect the received illumination light back through the first sub-prism as off-state illumination light, such that at least part of the off-state illumination light is internally reflected from a first output surface of the second sub-prism and exits the second sub-prism through a second output surface of the second sub-prism, the first output surface of the second sub-prism being different from each of the second output surface and the second interface surface of the second sub-prism.

17. The projection apparatus according to claim 16, wherein while the projection apparatus is in an on state, the panel is to reflect the received illumination light back through the first sub-prism as on-state illumination light, such that the on-state illumination light exits from the second sub-prism through the first output surface of the second sub-prism.

18. The projection apparatus according to claim 16, wherein:
a first base surface of the first sub-prism is perpendicular to the first interface surface of the first sub-prism, and a second base surface of the second sub-prism is perpendicular to the second interface surface of the second sub-prism; and
the first base surface of the first sub-prism is substantially congruent to the second base surface of the second sub-prism.

19. The projection apparatus according to claim 18, wherein the substantially congruent first and second base surfaces are substantially parallel.

* * * * *